(12) United States Patent
Shen

(10) Patent No.: US 10,356,372 B2
(45) Date of Patent: Jul. 16, 2019

(54) DOOR ACCESS SYSTEM

(71) Applicant: I-Ting Shen, Tainan (TW)

(72) Inventor: I-Ting Shen, Tainan (TW)

(*) Notice: Subject to any disclaimer, the term of this patent is extended or adjusted under 35 U.S.C. 154(b) by 17 days.

(21) Appl. No.: 15/435,338

(22) Filed: Feb. 17, 2017

(65) Prior Publication Data

US 2018/0213191 A1    Jul. 26, 2018

(30) Foreign Application Priority Data

Jan. 26, 2017    (TW) .............................. 106103131 A

(51) Int. Cl.
| | |
|---|---|
| *H04N 7/18* | (2006.01) |
| *G06F 1/3234* | (2019.01) |
| *G06F 1/3231* | (2019.01) |
| *G06K 9/00* | (2006.01) |
| *H04N 5/232* | (2006.01) |
| *G07C 9/00* | (2006.01) |

(52) U.S. Cl.
CPC ............ *H04N 7/186* (2013.01); *G06F 1/3231* (2013.01); *G06F 1/3265* (2013.01); *G06K 9/00892* (2013.01); *G07C 9/00174* (2013.01); *G07C 9/00563* (2013.01); *H04N 5/232411* (2018.08); *G06K 9/00006* (2013.01); *G06K 9/00221* (2013.01); *G06K 9/00597* (2013.01)

(58) Field of Classification Search
CPC .............. H04N 7/186; H04N 5/232411; G06F 1/3265; G06K 9/00892; G07C 9/00174; G07C 9/00563; G07C 9/571; E05F 15/73
See application file for complete search history.

(56) References Cited

U.S. PATENT DOCUMENTS

| | | | | |
|---|---|---|---|---|
| 3,701,100 | A * | 10/1972 | Yarbrough | G07C 9/00031 340/5.5 |
| 5,161,204 | A * | 11/1992 | Hutcheson | G06K 9/00221 382/157 |
| 6,108,437 | A * | 8/2000 | Lin | G06K 9/00221 382/118 |
| 6,323,761 | B1 * | 11/2001 | Son | B60R 25/10 340/426.35 |
| 9,985,731 | B1 * | 5/2018 | Khojasteh | H04B 15/02 |
| 10,032,327 | B1 * | 7/2018 | Xin | G07C 9/00158 |
| 10,049,520 | B2 * | 8/2018 | Gardiner | G06F 3/147 |

(Continued)

FOREIGN PATENT DOCUMENTS

WO     WO-8700384 A1 *   1/1987 ............. H04N 7/186

*Primary Examiner* — David E Harvey
(74) *Attorney, Agent, or Firm* — Alan D. Kamrath; Mayer & Williams PC

(57) ABSTRACT

A door access system includes a door transmittable to light and movable between a closed position and an open position. The door includes first and second sides. A door access control device is mounted to the door. A camera is located at an inside facing the second side of the door in the closed position and is in electrical connection with the door access control device. The camera is configured to pick up an image of a passerby at an outside facing the first side of the door in the closed position and is configured to send the image of the passerby to the door access control device for identifying an identity of the passerby. A door locking device is in electrical connection with the door access control device. The door access control device is configured to set the door locking device to a locking state or an unlocking state.

15 Claims, 10 Drawing Sheets

(56) References Cited

U.S. PATENT DOCUMENTS

| | | | | |
|---|---|---|---|---|
| 10,147,254 B1* | 12/2018 | Shen | | G07C 9/00309 |
| 10,151,135 B2* | 12/2018 | Shen | | E05F 15/73 |
| 2002/0067259 A1* | 6/2002 | Fufidio | | G07C 9/00031 |
| | | | | 340/541 |
| 2003/0039380 A1* | 2/2003 | Sukegawa | | G06K 9/00288 |
| | | | | 382/118 |
| 2004/0061027 A1* | 4/2004 | Movsesian | | B64C 1/1469 |
| | | | | 244/129.1 |
| 2004/0218789 A1* | 11/2004 | Polcha | | G06K 9/0002 |
| | | | | 382/124 |
| 2004/0264746 A1* | 12/2004 | Polcha | | G06K 9/0002 |
| | | | | 382/124 |
| 2006/0104488 A1* | 5/2006 | Bazakos | | G06K 9/00255 |
| | | | | 382/118 |
| 2006/0136743 A1* | 6/2006 | Polcha | | G06F 21/32 |
| | | | | 713/186 |
| 2006/0181402 A1* | 8/2006 | Martin | | G08B 13/19608 |
| | | | | 340/506 |
| 2008/0212849 A1* | 9/2008 | Gao | | G06K 9/00255 |
| | | | | 382/118 |
| 2009/0167493 A1* | 7/2009 | Colciago | | E05G 5/003 |
| | | | | 340/5.83 |
| 2009/0213221 A1* | 8/2009 | Kanda | | G08B 13/19645 |
| | | | | 348/156 |
| 2011/0292213 A1* | 12/2011 | Lacey | | H04N 7/181 |
| | | | | 348/153 |
| 2013/0008958 A1* | 1/2013 | Smith | | G07C 9/00904 |
| | | | | 235/382 |
| 2013/0027180 A1* | 1/2013 | Lakamraju | | G07C 9/00087 |
| | | | | 340/5.53 |
| 2015/0356802 A1* | 12/2015 | Cho | | G07C 9/00563 |
| | | | | 700/275 |
| 2016/0307380 A1* | 10/2016 | Ho | | G07C 9/00079 |
| 2017/0193723 A1* | 7/2017 | Park | | E05B 47/00 |
| 2017/0358160 A1* | 12/2017 | Gardiner | | G06F 3/147 |
| 2018/0053363 A1* | 2/2018 | Ravida | | H04N 7/186 |
| 2018/0291650 A1* | 10/2018 | Zabala Zabaleta | | |
| | | | | G07C 9/00571 |

* cited by examiner

DOOR ACCESS SYSTEM

BACKGROUND OF THE INVENTION

The present invention relates to a door access system and, more particularly, to a door access system using electronic identification to identify the identity of a passerby before opening a door.

With the progress of technology, door access control has gradually changed from mechanical door locks into electric door locks with electronic and electric control. The electric door locks generally use door access cards, mobile devices (such as mobile phones), input devices for inputting pin codes, biological features (such as fingerprints), etc. to identify the identity of the passerby, thereby controlling the door lock to be in a locking state in which the door cannot be opened or an unlocked state in which the door can be opened.

Electric door locks still require a passerby to hold the door access card or to input a pin code or biological features. In a case that the passerby has to hold objects with both hands, the unlocking operation will be very inconvenient. Improvement in this regard is desired.

Furthermore, doors using electric or mechanical door locks are often opaque. When the doors are mounted in a space not permitting installation of windows, a person in the space would feel oppressed.

BRIEF SUMMARY OF THE INVENTION

In a first aspect, a door access system includes a door transmittable to light and movable between a closed position and an open position. The door includes a first side and a second side. A door access control device is mounted to the door. A camera is located at an inside facing the second side of the door in the closed position and is in electrical connection with the door access control device. The camera is configured to pick up an image of a passerby at an outside facing the first side of the door in the closed position and is configured to send the image of the passerby to the door access control device for identifying an identity of the passerby. A door locking device is in electrical connection with the door access control device. The door access control device is configured to set the door locking device to a locking state or an unlocking state.

When the door is in the closed position and the door locking device is set to the locking state, the door is not movable from the closed position to the open position. When the door is in the closed position and the door locking device is set to the unlocking state, the door is movable from the closed position to the open position. When the door access control device uses the image picked up by the camera and identifies the passerby as an authorized person granted with door access authority, the door access control device sets the door locking device to the unlocking state. When the door access control device uses the image picked up by the camera and identifies the passerby as a non-authorized person not granted with door access authority, the door access control device sets the door locking device to the locking state.

In an example, the door access control device includes a control module in electrical connection with the camera and an awakening device in electrical connection with the control module. The awakening device is configured to detect a presence of the passerby at the outside of the door. When no presence of the passerby at the outside of the door is detected, the control module controls the camera to hibernate. When the presence of the passerby at the outside of the door is detected, the control module controls the camera to pick up the image of the passerby and to send the image of the passerby to the control module.

In an example, the door access control device further includes a screen in electrical connection with the control module. The screen displays a first message when the door access control device sets the door locking device to the unlocking state. The screen displays a second message when the door access control device sets the door locking device to the locking state. When no presence of the passerby at the outside of the door is detected, the control module controls the screen to hibernate.

In an example, the door further includes a double-sided mirror mounted to the first side of the door. The double-sided mirror includes an inner face and an outer face. The double-sided mirror further includes a translucent reflective layer mounted to the outer face thereof. An intensity of a reflected portion of light reflected by the translucent reflective layer is greater than an intensity of a transmitted portion of the light transmitted through the second side to the first side of the door. The door access control device further includes a transparent screen in electrical connection with the control module. The transparent screen abuts the inner surface of the double-sided mirror. The transparent screen displays a first message when the door access control device sets the door locking device to the unlocking state. The transparent screen displays a second message when the door access control device sets the door locking device to the locking state. When no presence of the passerby at the outside of the door is detected, the control module controls the transparent screen to hibernate.

In an example, the door further includes a translucent reflective layer mounted to the first side of the door. An intensity of a reflected portion of Rail light reflected by the translucent reflective layer is greater than an intensity of a transmitted portion of the light transmitted through the second side to the first side of the door.

In an example, the door further includes a frame having a first engaging portion and a second engaging portion. The frame further includes a chamber between the first and second engaging portions. The door access control device is mounted in the chamber and is coupled to the frame. A double-sided mirror is mounted to the first engaging portion of the frame. The double-sided mirror includes an inner face abutting a side of the first engaging portion and an outer face opposite to the inner face. The translucent reflective layer is disposed on the outer face of the double-sided mirror. A light-transmittable mirror is mounted to the second engaging portion of the frame.

In an example, the light-transmittable mirror further includes a light blocking layer disposed on a portion of an outer side of the light-transmittable mirror. The light blocking layer covers the door access control device. The light blocking layer has an area slightly larger than an area of the door access control device. The light blocking layer is configured to block light from passing through the door access control device.

In a second aspect, a door access system includes a door transmittable to light and movable between a closed position and an open position. The door includes a first side and a second side. A door access control device is mounted to the door. The door access control device includes a control module and an input device in electrical connection with the control module. The input device is mounted to the first side of the door. The input device is configured to input unlocking information. A camera is located at an inside facing the second side of the door in the closed position and is in electrical connection with the control module. The camera is configured to pick up an image of a passerby at an outside facing the first side of the door in the closed position and is configured to send the image of the passerby to the door access control device for identifying an identity of the passerby. A door locking device is in electrical connection with the door access control device. The door access control device is configured to set the door locking device to a locking state or an unlocking state.

When the door is in the closed position and the door locking device is set to the locking state, the door is not movable from the closed position to the open position. When the door is in the closed position and the door locking device is set to the unlocking state, the door is movable from the closed position to the open position.

When the door access control device uses the image picked up by the camera and identifies the passerby as an authorized person granted with door access authority, and the control module identifies the unlocking information inputted through the input device is correct, the door access control device sets the door locking device to the unlocking state.

When the door access control device uses the image picked up by the camera and identifies the passerby as an authorized person granted with door access authority and the control module identifies the unlocking information inputted through the input device is incorrect, the door access control device sets the door locking device to the locking state.

When the door access control device uses the image picked up by the camera and identifies the passerby as a non-authorized person not granted with door access authority, the door access control device sets the door locking device to the locking state.

In an example, the door access control device further includes an awakening device in electrical connection with the control module. The awakening device is configured to detect a presence of the passerby at the outside of the door. When no presence of the passerby at the outside of the door of the door is detected, the control module controls the camera and the input device to hibernate. When the presence of the passerby at the outside of the door is detected, the control module controls the camera to pick up the image of the passerby and to send the image of the passerby to the control module and controls the input device to operate.

In an example, the door access control device further includes a screen in electrical connection with the control module. The screen displays a first message when the door access control device sets the door locking device to the unlocking state. The screen displays a second message when the door access control device sets the door locking device to the locking state. When no presence of the passerby at the outside of the door is detected, the control module controls the screen to hibernate.

In an example, the door further includes a double-sided mirror mounted to the first side. The double-sided mirror includes an inner face and an outer face. The double-sided mirror further includes a translucent reflective layer mounted to the outer face thereof. An intensity of a reflected portion of light reflected by the translucent reflective layer is greater than an intensity of a transmitted portion of the light transmitted through the second side to the first side of the door. The door access control device further includes a transparent screen in electrical connection with the control module. The transparent screen abuts the inner surface of the double-sided mirror. The transparent screen displays a first message when the door access control device sets the door locking device to the unlocking state. The transparent screen displays a second message when the door access control device sets the door locking device to the locking state. When no presence of the passerby at the outside of the door is detected, the control module controls the transparent screen to hibernate.

In an example, the door further includes a translucent reflective layer mounted to the first side thereof. An intensity of a reflected portion of light reflected by the translucent reflective layer is greater than an intensity of a transmitted portion of the light transmitted through the second side to the first side of the door.

In an example, the door further includes a frame having a first engaging portion and a second engaging portion. The frame further includes a chamber between the first and second engaging portions. The door access control device is mounted in the chamber and is coupled to the frame. A double-sided mirror is mounted to the first engaging portion of the frame. The double-sided mirror includes an inner face abutting a side of the first engaging portion and an outer face opposite to the inner face. The translucent reflective layer is disposed on the outer face of the double-sided mirror. A light-transmittable mirror is mounted to the second engaging portion of the frame.

In an example, the light-transmittable mirror further includes a light blocking layer disposed on a portion of an outer side of the light-transmittable mirror. The light blocking layer covers the door access control device. The light blocking layer has an area slightly larger than an area of the door access control device. The light blocking layer is configured to block light from passing through the door access control device.

In a third aspect, a door access system includes a door having a first side and a second side. The door further includes a frame having a first engaging portion at the first side and a second engaging portion at the second side. The frame further includes a chamber between the first and second engaging portions. The door further includes a double-sided mirror mounted to the first engaging portion of the frame. The double-sided mirror includes an inner face abutting a side of the first engaging portion and an outer face opposite to the inner face. The double-sided mirror further includes a translucent reflective layer mounted to the outer face thereof. A light-transmittable mirror is mounted to the second engaging portion of the frame. An intensity of a reflected portion of light reflected by the translucent reflective layer is greater than an intensity of a transmitted portion of the light transmitted through the second side to the first side of the door. The door is movable between a closed position and an open position. A door access control device is mounted in the chamber and is coupled to the frame. A camera is mounted in the chamber and is in electrical connection with the door access control device. The camera is configured to pick up an image of a passerby at an outside facing the first side of the door in the closed position and is configured to send the image of the passerby to the door access control device for identifying an identity of the passerby. A door locking device is in electrical connection with the door access control device. The door access control device is configured to set the door locking device to a locking state or an unlocking state.

When the door is in the closed position and the door locking device is set to the locking state, the door is not movable from the closed position to the open position. When the door is in the closed position and the door locking device is set to the unlocking state, the door is movable from the closed position to the open position. When the door access control device uses the image picked up by the camera and identifies the passerby as an authorized person granted with door access authority, the door access control device sets the door locking device to the unlocking state. When the door access control device uses the image picked up by the camera and identifies the passerby as a non-authorized person not granted with door access authority, the door access control device sets the door locking device to the locking state.

In an example, the light-transmittable mirror further includes a light blocking layer disposed on a portion of an outer side of the light-transmittable mirror. The light blocking layer covers the door access control device. The light blocking layer has an area slightly larger than an area of the door access control device. The light blocking layer is configured to block light from passing through the door access control device.

In an example, the door access control device further includes a control module in electrical connection with the camera and an awakening device in electrical connection with the control module. The awakening device is configured to detect a presence of the passerby at the outside of the door. When no presence of the passerby at the outside of the door is detected, the control module controls the camera to hibernate. When the presence of the passerby at the outside of the door is detected, the control module controls the camera to pick up the image of the passerby and to send the image of the passerby to the control module.

In an example, the door access control device further includes a screen in electrical connection with the control module. The screen displays a first message when the door access control device sets the door locking device to the unlocking state. The screen displays a second message when the door access control device sets the door locking device to the locking state. When no presence of the passerby at the outside of the door is detected, the control module controls the screen to hibernate.

In an example, the door access control device further includes a transparent screen in electrical connection with the control module. The transparent screen abuts the inner surface of the double-sided mirror. The transparent screen displays a first message when the door access control device sets the door locking device to the unlocking state. The transparent screen displays a second message when the door access control device sets the door locking device to the locking state. When no presence of the passerby at the outside of the door is detected, the control module controls the transparent screen to hibernate.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
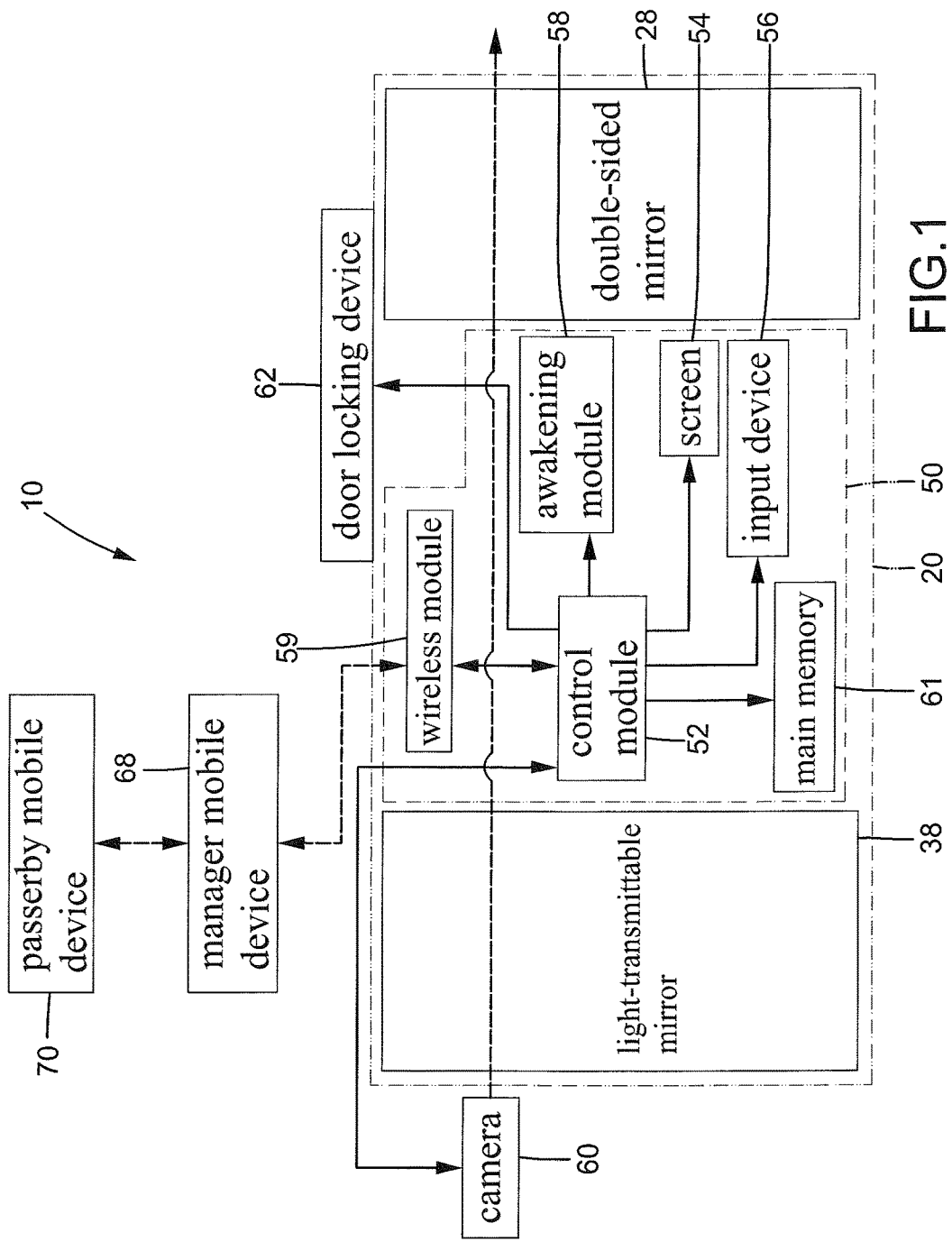
FIG. 1 is a diagrammatic block diagram of a door access system of a first embodiment according to the present invention.
Figure 2:
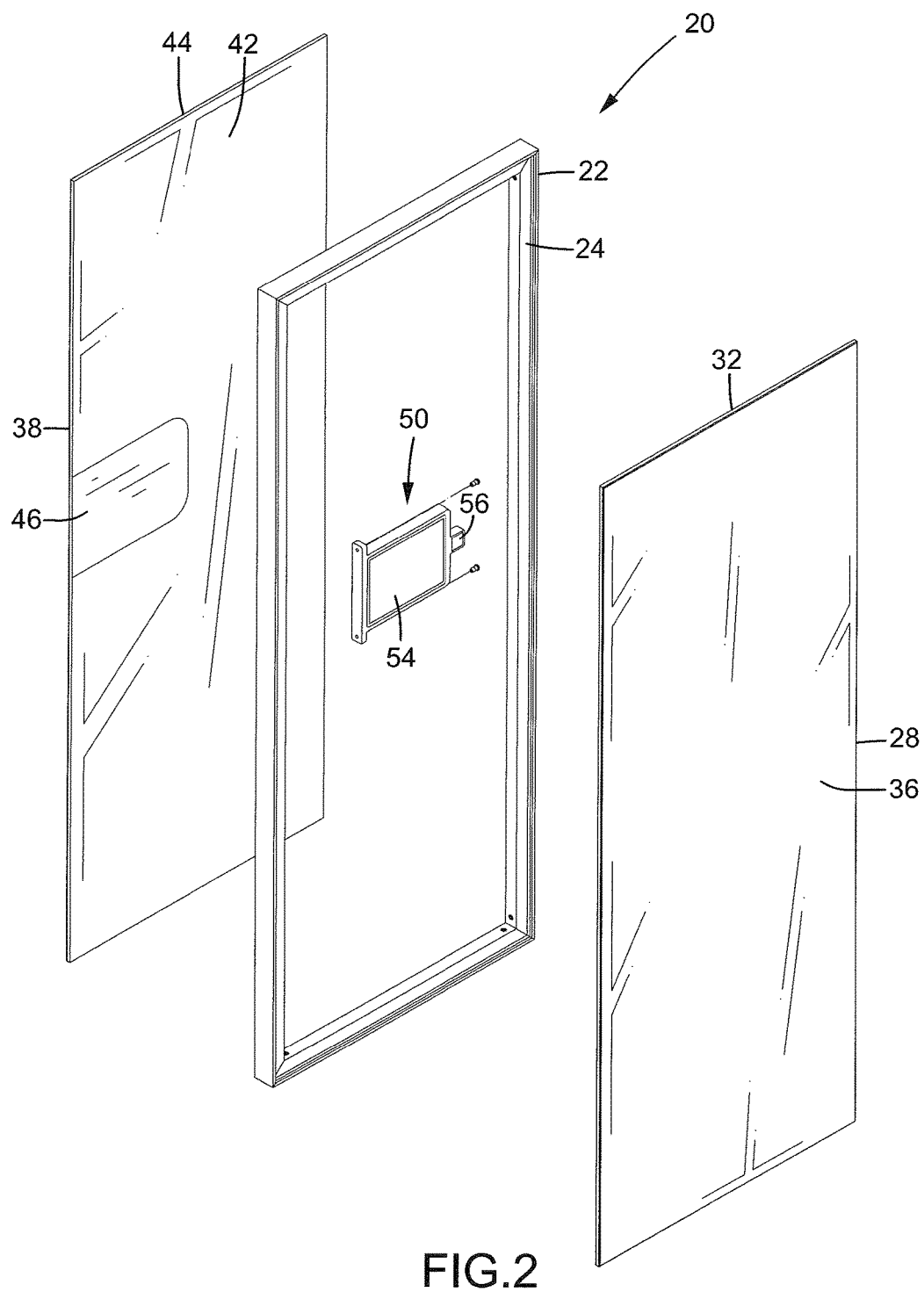
FIG. 2 is an exploded, perspective view of a door using the door access system of the first embodiment.
Figure 3:
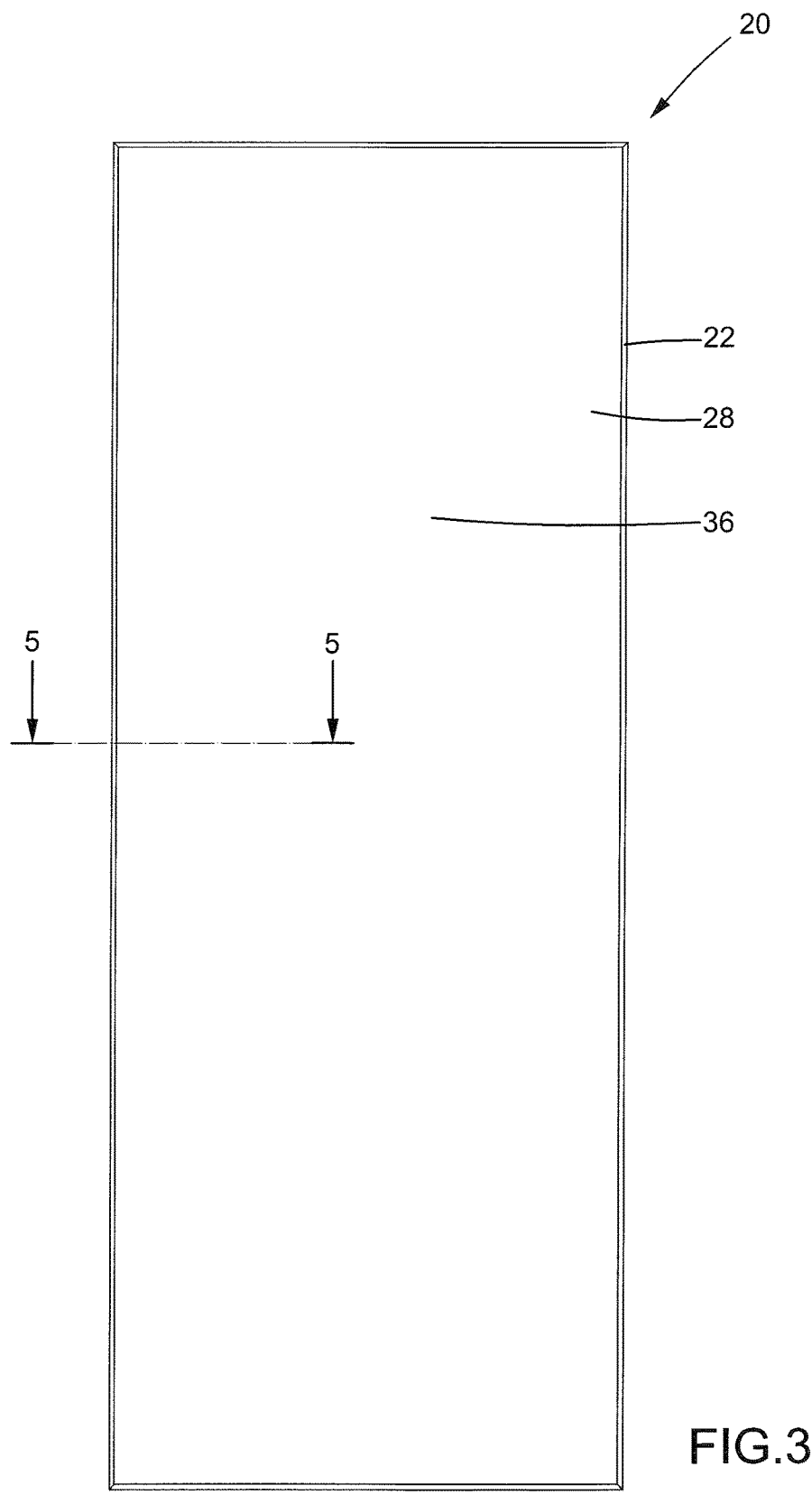
FIG. 3 is a front view of the door of FIG. 2 after assembly.
Figure 4:
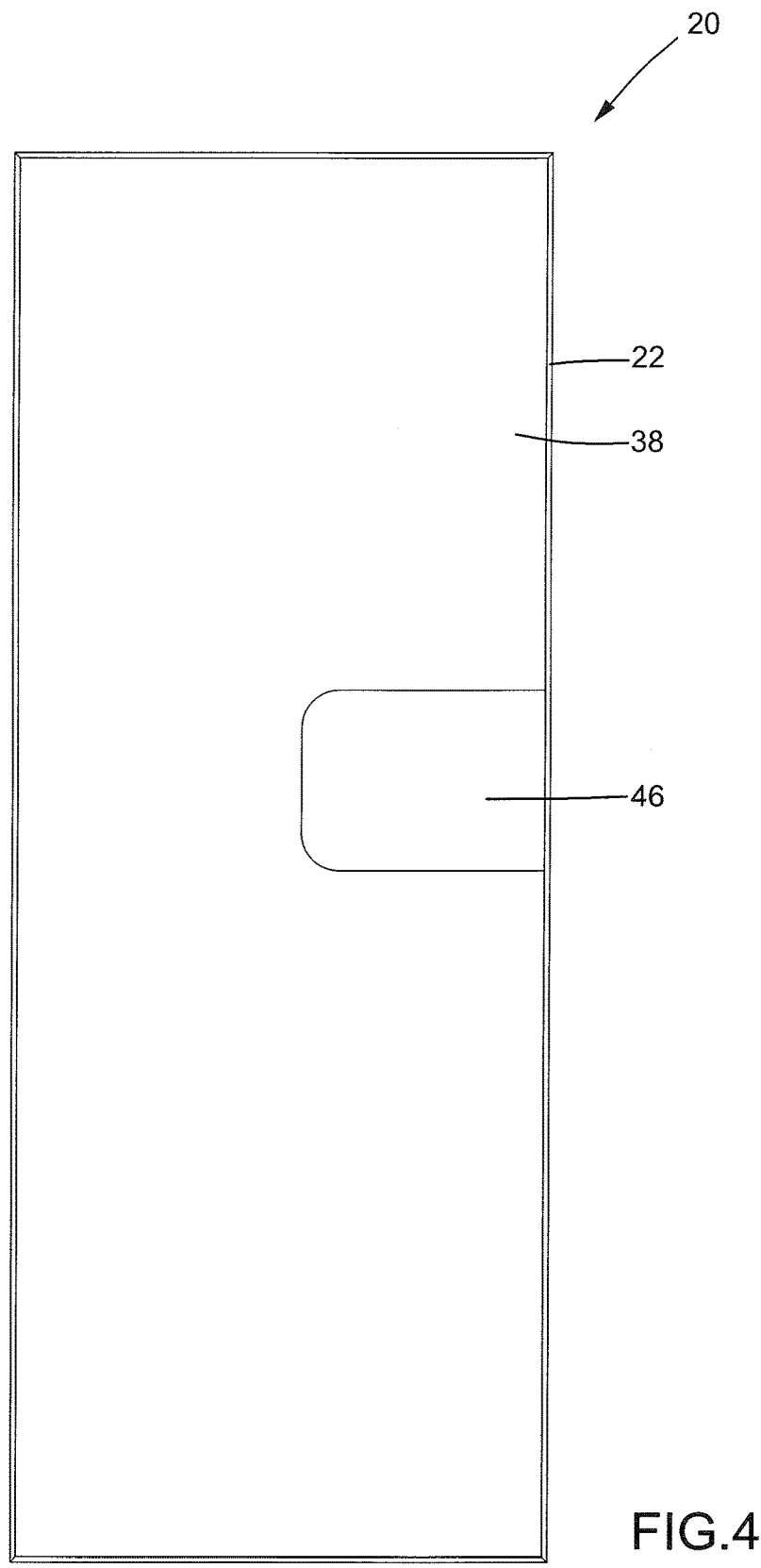
FIG. 4 is a rear view of the door of FIG. 2 after assembly.
Figure 5:
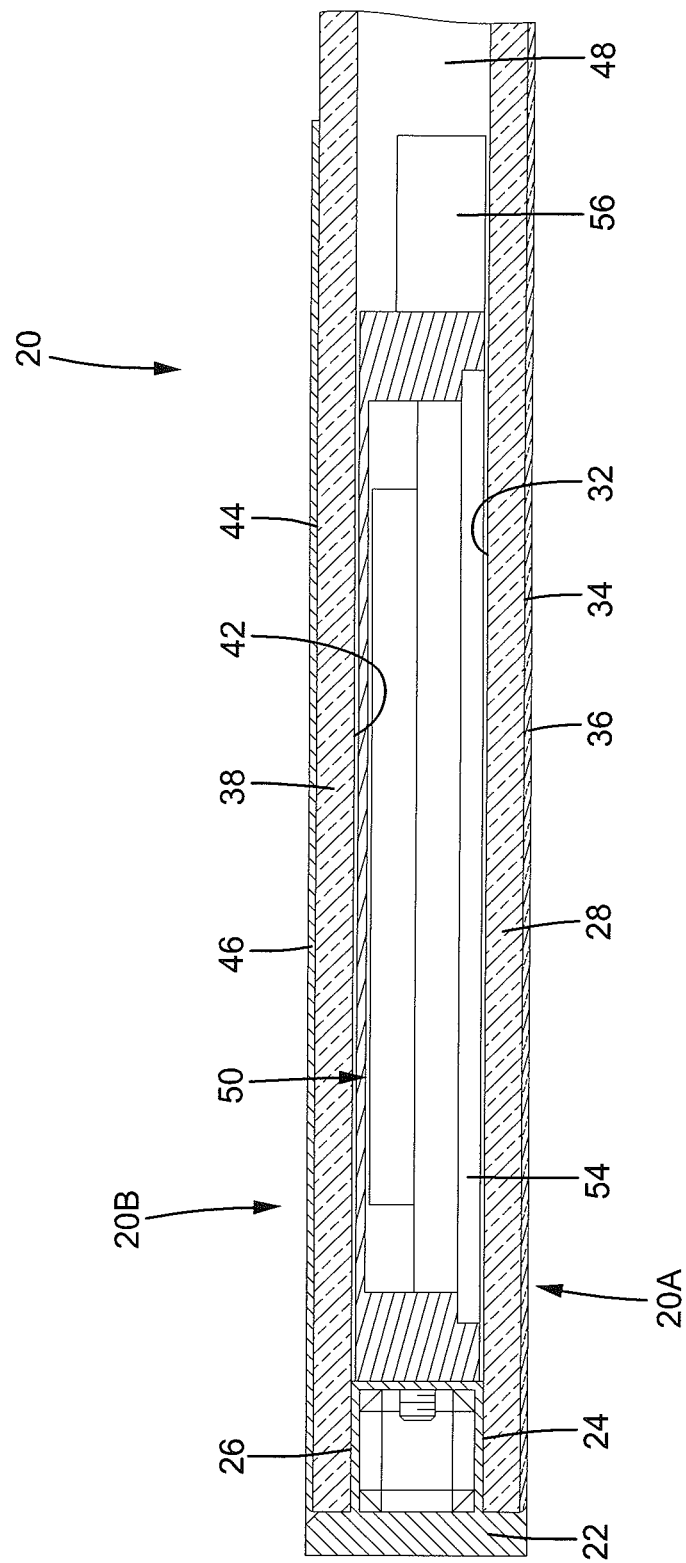
FIG. 5 is a cross sectional view taken along section line 5-5 of FIG. 3.
Figure 6:
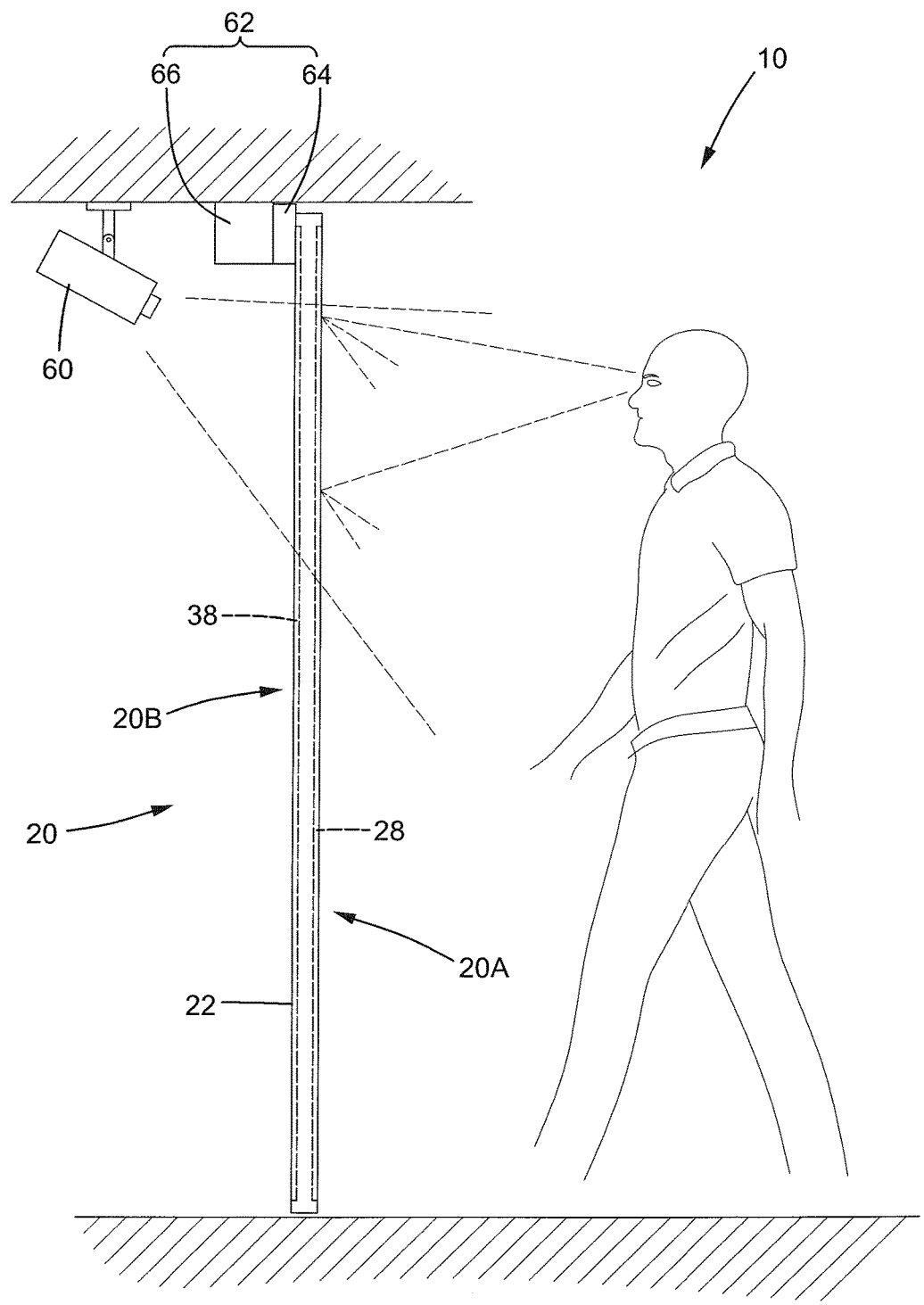
FIG. 6 is a diagrammatic view illustrating use of the door access system of the first embodiment.
Figure 7:
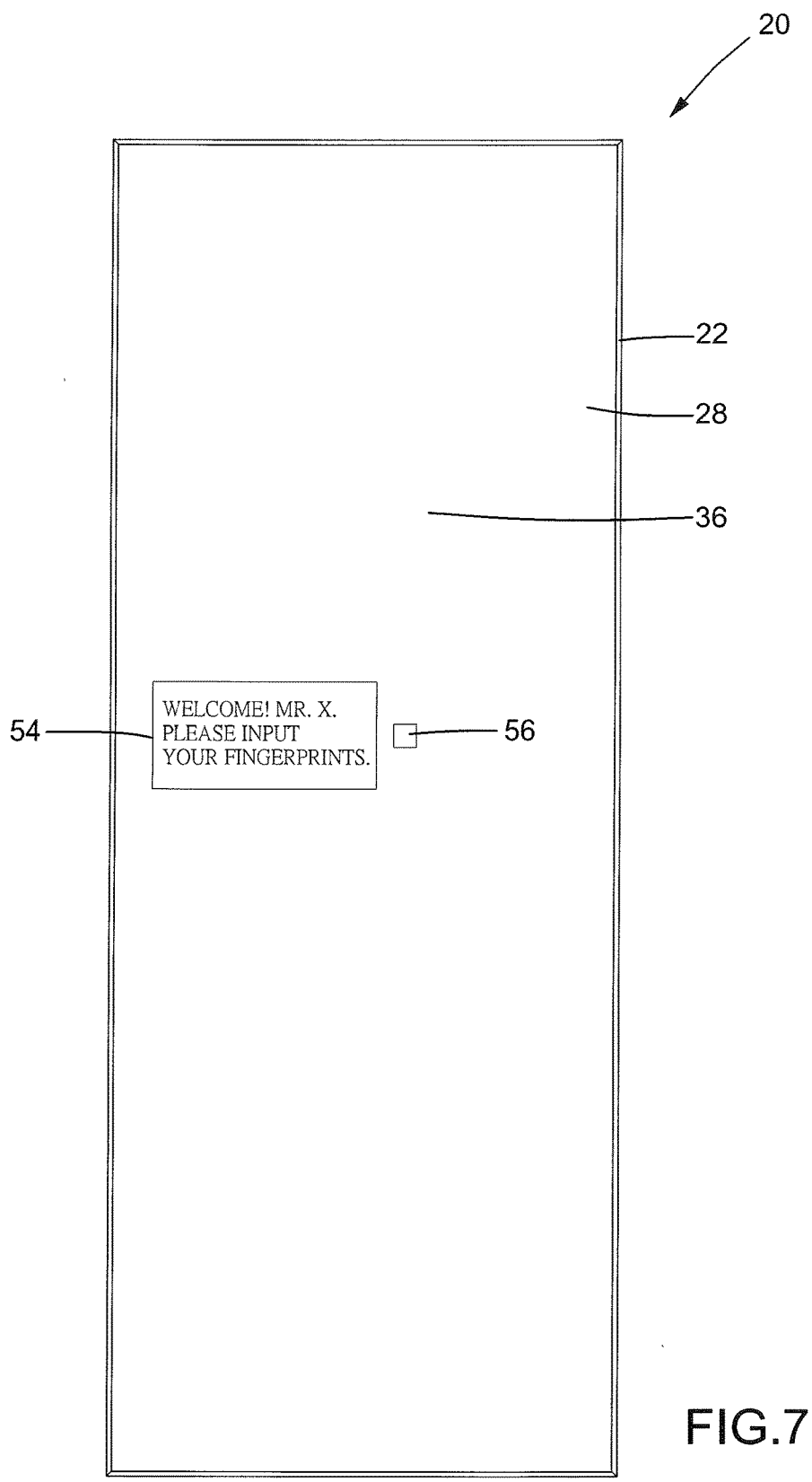
FIG. 7 is a front view of the door of FIG. 2, illustrating operation of a screen of the door access system of the first embodiment.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "inner", "outer", "side", "face", "portion", "inside", "outside", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

With reference to FIGS. 1-7, a door access system 10 of a first embodiment according to the present invention includes a door 20 transmittable to light and having a frame 22. Door 20 includes a first side 20A on a side of frame 22 and a second side 20B on the other side of frame 22. Frame 22 includes a first engaging portion 24 and a second engaging portion 26. First engaging portion 24 is on first side 20A of door 20, and second engaging portion 26 is on second side 20B of door 20. Frame 22 further includes a chamber 48 located between first and second engaging portions 24 and 26. In this embodiment, each of first and second engaging portions 24 has a recess intercommunicated with chamber 48.

A door access control device 50 is mounted in chamber 48 and includes a control module 52, an awakening device 58, a screen 54, an input device 56, and a main memory 61 (FIG. 1). Awakening device 58, screen 54, input device 56, and main memory 61 are in electrical connection with the control module 52. Door access control device 50 is securely mounted to a side of frame 22 (the right side of frame 22, see FIGS. 3 and 5).

Main memory 61 is used to store authenticated unlocking information registered in advance. Awakening device 58 is configured to detect the presence of the passerby at the outside of the door 20. Input device 56 is configured to input unlocking information by the passerby. Input device 56 can be a fingerprint pickup device, an iris pickup device, a keyboard for entering digital numbers and/or letters, a touch screen (such as screen 54), or a microphone. A wireless module 59 provides connection between a manager mobile device 68 held by a manager and door access control device 50. Manager mobile device 68 can use wireless module 59 to register authenticated unlocking information into main memory 61. Unlocking information can be the image of the passerby (such as the facial pattern), or the image of the passerby plus the fingerprints, iris, or vocal patterns of the passerby, a pin code consisting of digital numbers and/or letters, or a specific figure (inputted through the touch screen). Furthermore, screen 54 is used to display the state of door access system 10. For example, when door locking device 62 is set to the unlocking state, screen 54 displays the identity of the passerby or a welcome message, and/or a message requesting the passerby to input additional unlocking information including one of the fingerprints, iris, or vocal patterns of the passerby, a pin code consisting of digital numbers and/or letters, or a specific figure (see FIG. 7). Screen 54 can also display an error message if the unlocking information inputted by the passerby is incorrect.

Door 20 further includes a double-sided mirror 28 received in first engaging portion 24 and located at first side 20A. Double-sided mirror 28 includes an inner face 32 abutting a side of first engaging portion 24 and an outer face 34 opposite to inner face 32. Double-sided mirror 28 further includes a translucent reflective layer 36 mounted to outer face 34. Translucent reflective layer 36 can be a metal film (such as a silver film or an aluminum film) coated on outer face 34. Translucent reflective layer 36 reflects a portion of a light and permits transmission of another portion of the light. Namely, translucent reflective layer 36 is used to increase the reflectivity on outer face 34 of double-sided mirror 28, but the un-reflected portion of the light can pass through double-sided mirror 28. The intensity of a reflected portion of flail light reflected by translucent reflective layer 36 is greater than the intensity of a transmitted portion of the light transmitted through second side 20B to first side 20A of door 20.

Screen 54 abuts inner face 32 of double-sided mirror 28. When screen 54 operates, the light generated by screen 54 can pass through double-sided mirror 28, such that the passerby at the outside of door 20 and facing first side 20A can see the picture of screen 54. In a case that input device 56 is a fingerprint pickup device, an iris pickup device, or a touch screen, input device 56 can abut inner face 32 of double-sided mirror 28 while permitting operation. In another case that input device 56 is a keyboard for entering digital numbers and/or letters or a microphone, a window must be provided in a location to permit access to input device 56.

Door 20 further includes a light-transmittable mirror 38 received in second engaging portion 26 and located at second side 20B. Light-transmittable mirror 38 includes an inner side 42 abutting a side of second engaging portion 26 and an outer side 44 opposite to inner side 42. Light-transmittable mirror 38 further includes a light blocking layer 46 (FIG. 4) disposed on a portion of an outer side 44 of light-transmittable mirror 38 and covering door access control device 50. Light blocking layer 46 has an area slightly larger than an area of door access control device 50 and is configured to block light from passing through door access control device 50. Since door access control device 50 is covered by light blocking layer 46, door access control device 50 cannot be seen when viewing light-transmittable mirror 38 from second side 20B of door 20.

Door 20 can be mounted in a passageway between two spaces (which are referred to as an inside and an outside for ease of explanation). When door 20 is in a closed position, double-sided mirror 28 faces the outside, and light-transmittable mirror 38 faces the inside. Preferably, the intensity of the light at the inside of door 20 is weaker than the intensity of the light at the outside of door 20. Thus, the inside of door 20 cannot be seen from the outside of door 20.

Door access system 10 further includes a camera 60 in electrical connection with the door access control device 50, such as in electrical connection with control module 52. Camera 60 can be mounted to a ceiling at the inside of door 20 facing the second side 20B of the door 20 in the closed position. Since a portion of light can pass from the outside of door 20 through first side 20A, double-sided mirror 28, and second side 20B to the inside of door 20, camera 60 can pick up the image at the outside of door 20 and can send the image to door access control device 50.

In this embodiment, door access system 10 further includes a door locking device 62 mounted between camera 60 and door 20 in the closed position. Door locking device 62 in this embodiment is a magnetic lock and includes a first portion 64 made of a magnetically attractive material and secured to the inside of door 20 and a second portion 66 fixed to the ceiling. Second portion 66 is made of a material that generates a magnetic force when supplied with electricity. Door access control device 50 is configured to set the door locking device 62 to a locking state or an unlocking state. When door locking device 62 is set to the locking state, second portion 66 is supplied with electricity to generate a magnetic force attracting first portion 64. When door locking device 62 is set to the unlocking state, second portion 66 is not supplied with electricity and does not generate the magnetic force.

Door access system 10 successfully matches with manager mobile device 68 (such as a mobile phone of the manager) via door access control device 50, such that the unlocking information of authorized persons granted with door access authority is registered in main memory 61 of door access control device 50. A passerby can connect his or her passerby mobile device 70 with manager mobile device 68 and can send his or her image, or his or her image plus his or her fingerprints, iris, or vocal patterns, a pin code consisting of digital numbers and/or letters, or a specific figure to manager mobile device 68 of the manager. If the manager approves the application of the passerby, the manager uses manager mobile device 68 to register the image of this passerby (such as the facial pattern), or the image of this passerby plus the fingerprints, iris, or vocal patterns of this passerby, a pin code consisting of digital numbers and/or letters, or a specific figure into main memory 61 as authenticated unlocking information. This passerby becomes an authorized person granted with the door access authority. Thus, door access system 10 can operate normally when door access control device 50 has at least one piece of data of authenticated unlocking information.

Now that the basic construction of door access system 10 has been explained, the operation and some of the advantages of door access system 10 can be set forth and appreciated. In particular, for the sake of explanation, it will be assumed that door 20 is in the closed position and door locking device 62 is set to the locking state, such that first portion 64 of door locking device 62 is attracted by the magnetic force of second portion 66. Thus, door 20 is not movable from the closed position to the open position.

In a case that door access control device 50 only uses the image of an authorized person as the authenticated unlocking information, control module 52 controls camera 60 and screen 54 to hibernate when no presence of the passerby at the outside of door 20 is detected. Door 20 provides a visual effect as a mirror when viewed from the outside of door 20 (see FIG. 3).

On the other hand, when awakening module 58 detects the presence of the passerby at the outside of door 20, awakening module 58 sends a signal to control module 52. Control module 52 awakens screen 54 and camera 60. Camera 60 picks up the image of the passerby and sends the image of the passerby to control module 52. Control module 52 compares the image of the passerby with the authenticated unlocking information. If the image of the passerby matches a piece of data of the authenticated unlocking information, control module 52 controls screen 54 to display a first message (such as a message including unlocking and welcome information) and sets door locking device 62 to the unlocking state, such that the passerby can move door 20 from the closed position to the open position. On the other hand, if the image of the passerby does not match any piece of data of the authenticated unlocking information, control module 52 controls screen 54 to display a second message (such as an error message) and sets door locking device 62 to the unlocking state (or door locking device 62 remains in the unlocking state). Thus, the passerby cannot move door 20 from the closed position to the open position.

In another case that door access control device 50 uses the image and fingerprints of an authorized person as the authenticated unlocking information (and input device 56 is a fingerprint pickup device), control module 52 controls camera 60, screen 54, and input device 56 to hibernate when no presence of the passerby at the outside of door 20 is detected.

On the other hand, when awakening module 58 detects the presence of the passerby at the outside of door 20, awakening module 58 sends a signal to control module 52. Control module 52 awakens screen 54, camera 60, and input device 56. Camera 60 picks up the image (such as the facial pattern) of the passerby and sends the image of the passerby to control module 52. Screen 54 displays a message requesting the passerby to input his or her fingerprints. Control module 52 compares the image and the fingerprints of the passerby with the authenticated unlocking information.

If the image and the fingerprints of the passerby match a piece of data (including image and fingerprints) of the authenticated unlocking information, control module 52 controls screen 54 to display a first message (such as a message including unlocking and welcome information) and sets door locking device 62 to the unlocking state, such that the passerby can move door 20 from the closed position to the open position.

On the other hand, if the image and fingerprints of the passerby do not match any piece of data of the authenticated unlocking information (at least one of the image and the fingerprints of the passerby is incorrect), control module 52 controls screen 54 to display a second message (such as an error message) and sets door locking device 62 to the unlocking state (or door locking device 62 remains in the unlocking state). Thus, the passerby cannot move door 20 from the closed position to the open position.

Figure 8:
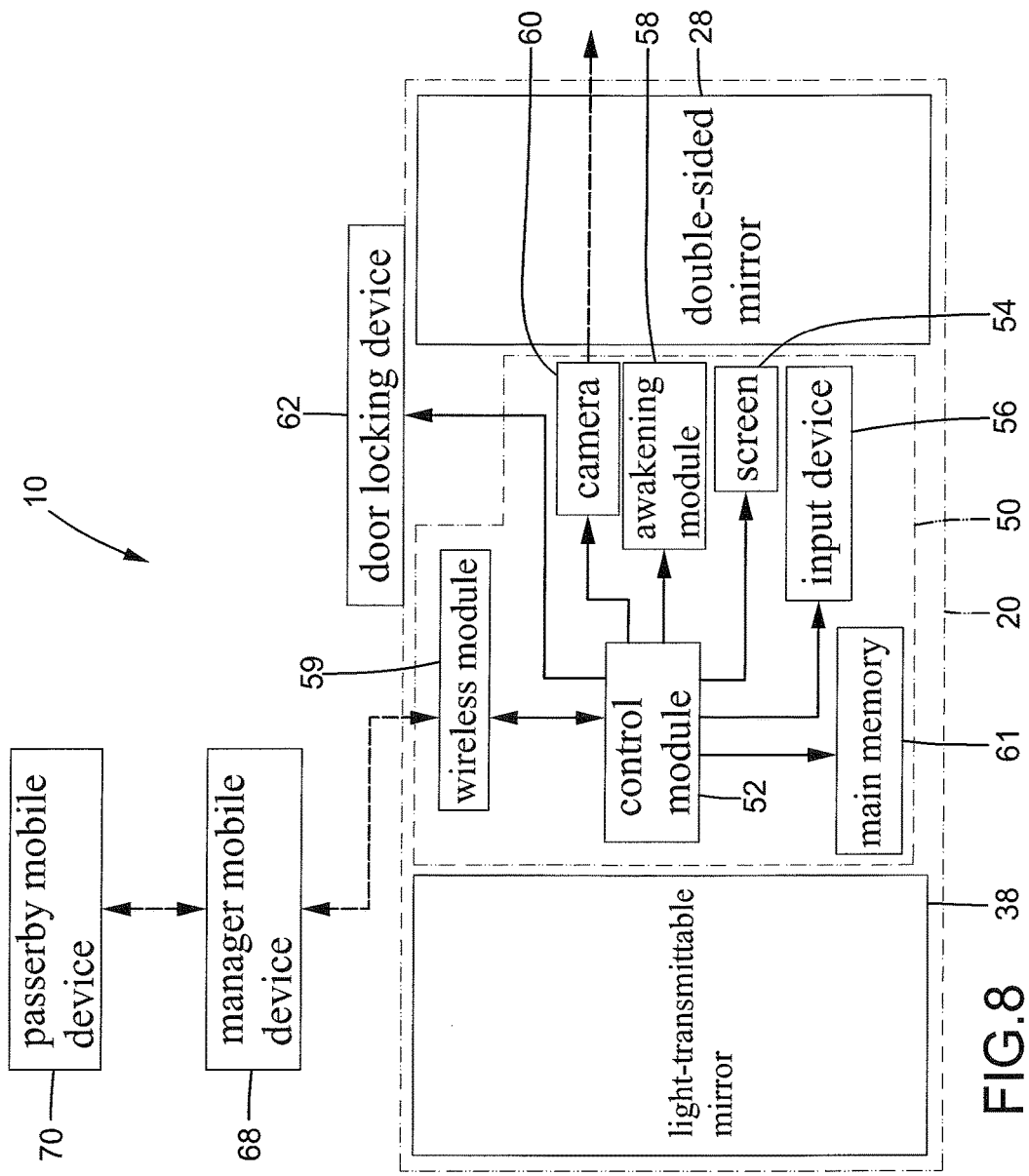
FIG. 8 is a diagrammatic block diagram of a door access system of a second embodiment according to the present invention.

FIG. 8 shows a door access system 10 of a second embodiment. In this embodiment, camera 60 is directly mounted in chamber 48 of door 20 to pick up the image of the passerby at the outside of door 20.

Figure 9:
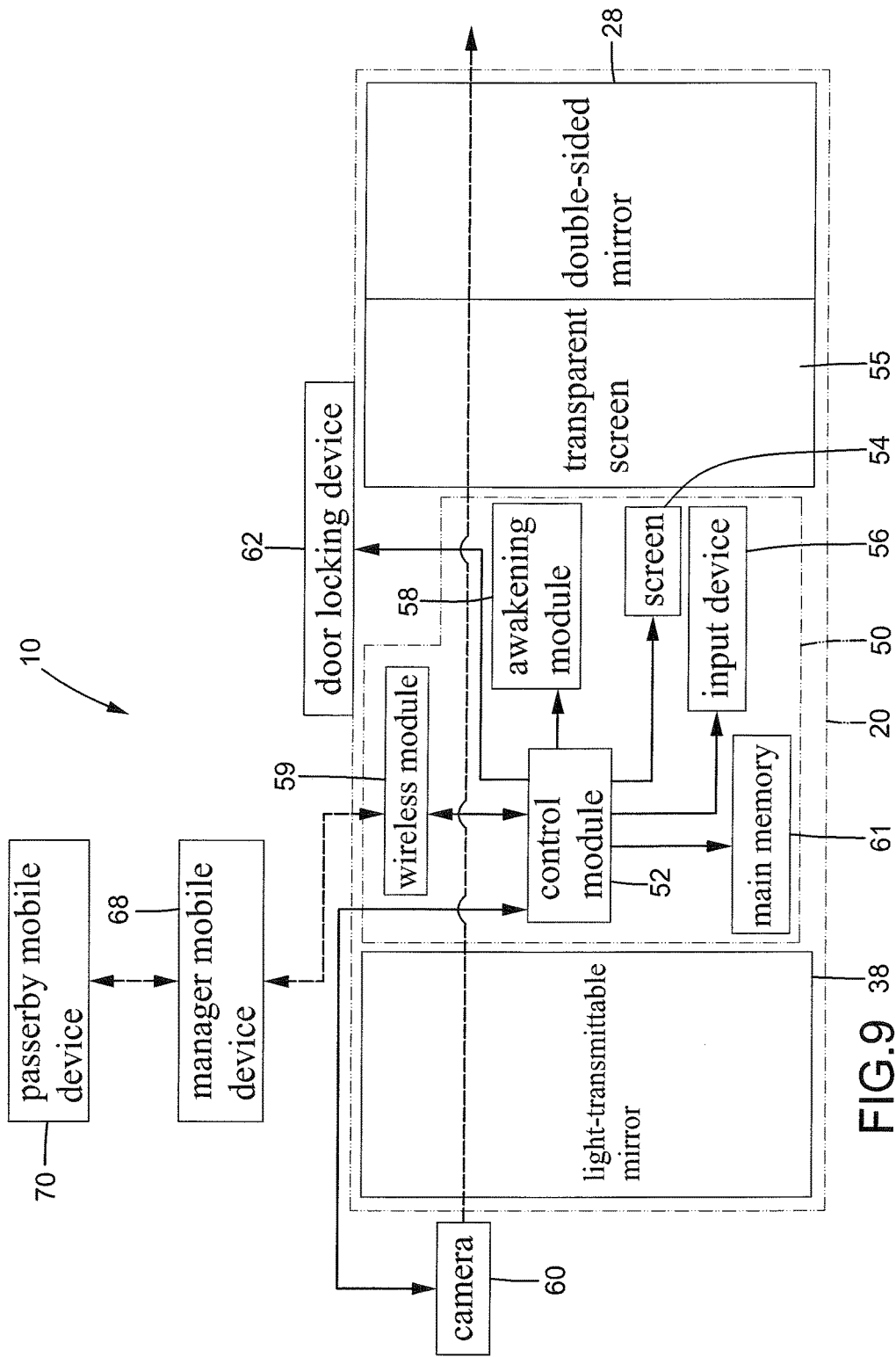
FIG. 9 is a diagrammatic block diagram of a door access system of a third embodiment according to the present invention.
Figure 10:
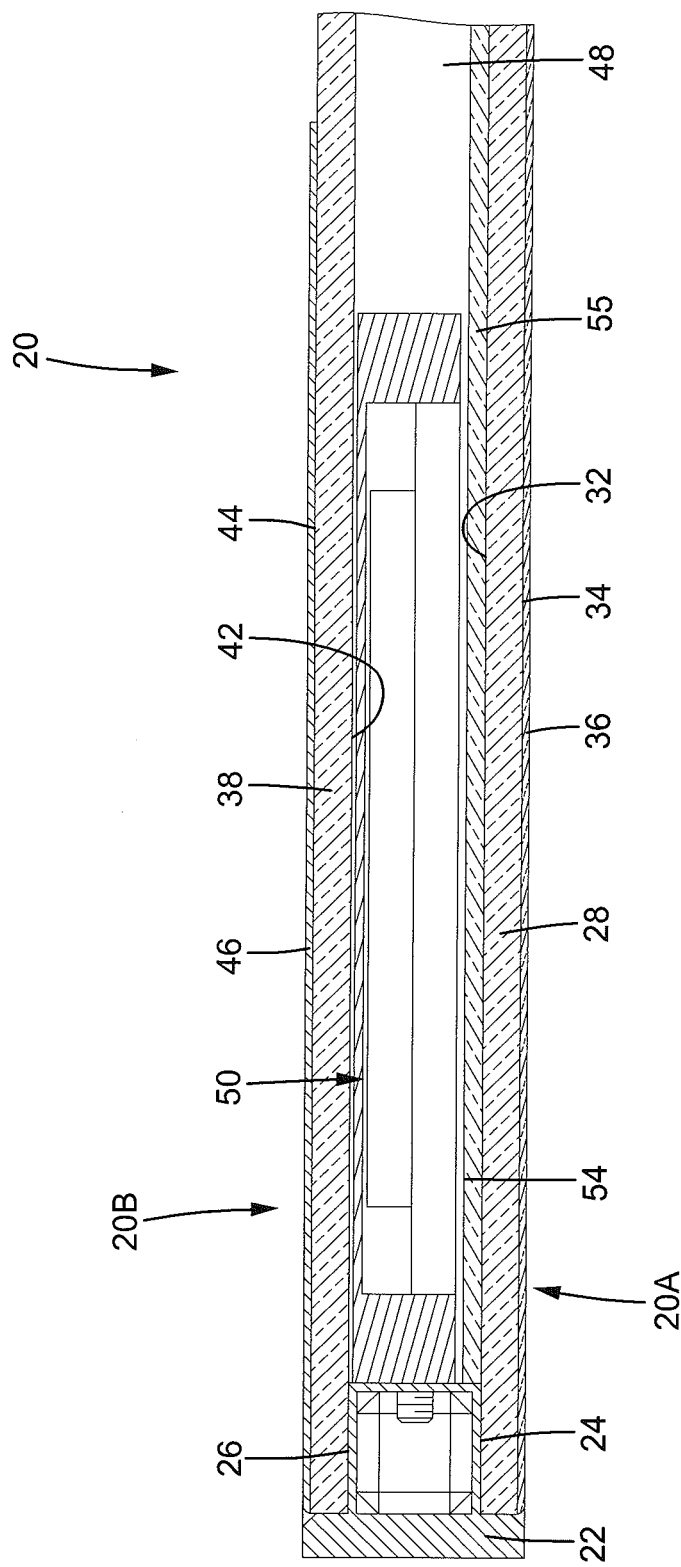
FIG. 10 is a cross sectional view of a door using the door access system of the third embodiment.

FIGS. 9 and 10 show a door access system 10 of a third embodiment. Specifically, screen 54 in the first embodiment only shows the picture in a portion of first side 20A of door 20. In the third embodiment, door access control device 50 includes a transparent screen 55 in electrical connection with control module 52. Transparent screen 55 abuts inner surface 32 of double-sided mirror 28 and can extend through the span of the whole double-sided mirror 28. Transparent screen 55 can be a transparent touch screen permitting input of the unlocking information other than the image. Transparent screen 55 displays a first message when door access control device 50 sets door locking device 62 to the unlocking state. On the other hand, transparent screen 55 displays a second message when door access control device 50 sets door locking device 62 to the locking state. When no presence of the passerby at the outside of the door 20 is detected, the control module 52 controls the transparent screen 55 to hibernate.

In each embodiment, if door access control device 50 only uses the image of an authorized person as the authenticated unlocking information, camera 60 picks up the image of the passerby at the outside of door 20, and control module 52 controls door locking device 62 to the locking state or the unlocking state. Thus, operation of the passerby is not required for the door access control.

In each embodiment, if door access control device 50 uses the image and additional unlocking information (one of the fingerprints, iris, or vocal patterns, a pin code consisting of digital numbers and/or letters, or a specific figure) as the authenticated unlocking information, door access control device 50 sets door locking device 62 to the unlocking state only when both of the image and the additional unlocking information are correct, which provides high security in use.

Furthermore, through use of double-sided mirror 28 and light-transmittable mirror 38, it is difficult to see the inside of door 20 from the outside of door 20, but a person at the inside of door 20 can see the outside of door 20, providing the function of a window while achieving the door access control function and keeping privacy.

Now that the basic teachings of the present invention have been explained, many extensions and variations will be obvious to one having ordinary skill in the art. For example, door access control device 50 does not have to include input device 56 without affecting the function of camera 60. Furthermore, light blocking layer 46 can be formed on inner side 42 of light-transmittable mirror 38, such that the whole light-transmittable mirror 38 provides the effect of a uniform mirror face while covering door access control device 50. Furthermore, door locking device 62 can be of a type other than a magnetic lock. For example, door locking device 62 can be a driving device for moving door 20 between the open position and the closed position. When the driving device is set to the locking state, the driving device controls door 20 to the closed position. On the other hand, when the driving device is set to the unlocking state, the driving device control controls door 20 to the open position.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A door access system comprising:
a door transmittable to light and movable between a closed position and an open position, with the door including a first side and a second side;
a door access control device mounted to the door and including a controller;
a camera located at an inside facing the second side of the door in the closed position and in electrical connection with the controller of the door access control device, with the camera configured to pick up an image of a passerby at an outside facing the first side of the door in the closed position and configured to send the image of the passerby to the door access control device for identifying an identity of the passerby; and a door locking device in electrical connection with the door access control device, with the door access control device configured to set the door locking device to a locking state or an unlocking state, with the door in the closed position and with the door locking device set to the locking state, the door is not movable from the closed position to the open position, with the door in the closed position and with the door locking device set to the unlocking state, the door is movable from the closed position to the open position, wherein when the door access control device uses the image picked up by the camera and identifies the passerby as an authorized person granted with door access authority, the door access control device sets the door locking device to the unlocking state, wherein when the door access control device uses the image picked up by the camera and identifies the passerby as a non-authorized person not granted with door access authority, the door access control device sets the door locking device to the locking state, with the door further including a double-sided mirror mounted to the first side of the door, with the double-sided mirror including an inner face and an outer face, with the double-sided mirror further including a translucent reflective layer mounted to the outer face thereof, with an intensity of a reflected portion of a light reflected by the translucent reflective layer being greater than an intensity of a transmitted portion of the light transmitted through the second side to the first side of the door, with the door access control device further including a transparent screen with the transparent screen abutting the inner surface of the double-sided mirror, wherein the transparent screen displays a first message when the door access control device sets the door locking device to the unlocking state, wherein the transparent screen displays a second message when the door access control device sets the door locking device to the locking state, and wherein when no presence of the passerby at the outside of the door is detected, the transparent screen is controlled to hibernate.

2. The door access system as claimed in claim 1, with the door access control device including:

an awakening detector in electrical connection with the controller, with the awakening detector configured to detect a presence of the passerby at the outside of the door, wherein when no presence of the passerby at the outside of the door is detected, the controller controls the camera to hibernate, and wherein when the presence of the passerby at the outside of the door is detected, the controller controls the camera to pick up the image of the passerby and to send the image of the passerby to the controller.

3. The door access system as claimed in claim 2, wherein the screen is in electrical connection with the controller and, under control of the controller:

displays the first message when the door access control device sets the door locking device to the unlocking state, displays the second message when the door access control device sets the door locking device to the locking state, and when no presence of the passerby at the outside of the door is detected, controls the screen to hibernate.

4. A door access system comprising:

a door transmittable to light and movable between a closed position and an open position, with the door including a first side and a second side;

a door access control device, including a controller, mounted to the door:

a camera located at an inside facing the second side of the door in the closed position and in electrical connection with the door access control device, with the camera configured to pick up an image of a passerby at an outside facing the first side of the door in the closed position and configured to send the image of the passerby to the door access control device for identifying an identity of the passerby; and a door locking device in electrical connection with the door access control device, with the door access control device configured to set the door locking device to a locking state or an unlocking state, with the door in the closed position and with the door locking device set to the locking state, the door is not movable from the closed position to the open position, with the door in the closed position and with the door locking device set to the unlocking state, the door is movable from the closed position to the open position, wherein when the door access control device uses the image picked up by the camera and identifies the passerby as an authorized person granted with door access authority, the door access control device sets the door locking device to the unlocking state, wherein when the door access control device uses the image picked up by the camera and identifies the passerby as a non-authorized person not granted with door access authority, the door access control device sets the door locking device to the locking state;

with the door further including:

a translucent reflective layer mounted to the first side of the door, with an intensity of a reflected portion of light reflected by the translucent reflective layer being greater than an intensity of a transmitted portion of the light transmitted through the second side to the first side of the door, a frame including a first engaging portion and a second engaging portion, with the frame further including a chamber between the first and second engaging portions, with the door access control device mounted in the chamber and coupled to the frame, a double-sided mirror mounted to the first engaging portion of the frame, with the double-sided mirror including an inner face abutting a side of the first engaging portion and an outer face opposite to the inner face, with the translucent reflective layer disposed on the outer face of the double-sided mirror, and a light-transmittable mirror mounted to the second engaging portion of the frame.

5. The door access system as claimed in claim 4, with the light-transmittable mirror further including a light blocking layer disposed on a portion of an outer side of the light-transmittable mirror, with the light blocking layer covering the door access control device, with the light blocking layer having an area slightly larger than an area of the door access control device, and with the light blocking layer configured to block light from passing through the door access control device.

6. A door access system comprising:
a door transmittable to light and movable between a closed position and an open position, with the door including a first side and a second side:
a door access control device mounted to the door, with the door access control device including a controller and an input device in electrical connection with the controller, with the input device mounted to the first side of the door, and with the input device configured to input unlocking Information:
a camera located at an inside facing the second side of the door in the closed position and in electrical connection with the controller, with the camera configured to pick up an image of a passerby at an outside facing the first side of the door in the closed position and configured to send the image of the passerby to the door access control device for identifying an identity of the passerby; and
a door locking device in electrical connection with the door access control device, with the door access control device configured to set the door locking device to a locking state or an unlocking state,
with the door in the closed position and with the door locking device set to the locking state, the door is not movable from the closed position to the open position,
with the door in the closed position and with the door locking device set to the unlocking state, the door is movable from the closed position to the open position,
wherein when the door access control device uses the image picked up by the camera and identifies the passerby as an authorized person granted with door access authority, and the controller identifies the unlocking information inputted through the input device is correct, the door access control device sets the door locking device to the unlocking state,
wherein when the door access control device uses the image picked up by the camera and identifies the passerby as an authorized person granted with door access authority and the controller identifies the unlocking information inputted through the input device is incorrect, the door access control device sets the door locking device to the locking state,
wherein when the door access control device uses the image picked up by the camera and identifies the passerby as a non-authorized person not granted with door access authority, the door access control device sets the door locking device to the locking state;
with the door further including a double-sided mirror mounted to the first side, with the double-sided mirror including an inner face and an outer face, with the double-sided mirror further including a translucent reflective layer mounted to the outer face thereof, with an intensity of a reflected portion of a light reflected by the translucent reflective layer being greater than an intensity of a transmitted portion of the light transmitted through the second side to the first side of the door,
with the door access control device further including a transparent screen with the transparent screen abutting the inner surface of the double-sided mirror,
wherein the transparent screen displays a first message when the door access control device sets the door locking device to the unlocking state,
wherein the transparent screen displays a second message when the door access control device sets the door locking device to the locking state, and
wherein when no presence of the passerby at the outside of the door is detected, the transparent screen to hibernate.

7. The door access system as claimed in claim 6, with the door access control device further including an awakening detector in electrical connection with the controller, with the awakening detector configured to detect a presence of the passerby at the outside of the door,
wherein when no presence of the passerby at the outside of the door of the door is detected, the controller controls the camera and the input device to hibernate, and
wherein when the presence of the passerby at the outside of the door is detected, the controller controls the camera to pick up the image of the passerby and to send the image of the passerby to the controller and controls the input device to operate.

8. The door access system as claimed in claim 6, wherein the screen is in electrical connection with the controller and, under control of the controller:
displays the first message when the door access control device sets the door locking device to the unlocking state,
displays the second message when the door access control device sets the door locking device to the locking state, and
when no presence of the passerby at the outside of the door is detected, controls the screen to hibernate.

9. A door access system comprising:
a door transmittable to light and movable between a closed position and an open position, with the door including a first side and a second side;
a door access control device mounted to the door with the door access control device including a controller and an input device in electrical connection with the controller, with the input device mounted to the first side of the door, and with the input device configured to input unlocking information:
a camera located at an inside facing the second side of the door in the closed position and in electrical connection with the controller, with the camera configured to pick up an image of a passerby at an outside facing the first side of the door in the closed position and configured to send the image of the passerby to the door access control device for identifying an identity of the passerby; and
a door locking device in electrical connection with the door access control device, with the door access control device configured to set the door locking device to a locking state or an unlocking state,
with the door in the closed position and with the door locking device set to the locking state, the door is not movable from the closed position to the open position,
with the door in the closed position and with the door locking device set to the unlocking state, the door is movable from the closed position to the open position,
wherein when the door access control device uses the image picked up by the camera and identifies the passerby as an authorized person granted with door access authority, and the controller identifies the unlocking information inputted through the input device is correct, the door access control device sets the door locking device to the unlocking state, wherein when the door access control device uses the image picked up by the camera and identifies the passerby as an authorized person granted with door access authority and the controller identifies the unlocking information inputted through the input device is incorrect, the door access control device sets the door locking device to the locking state, wherein when the door access control device uses the image picked up by the camera and identifies the passerby as a non-authorized person not granted with door access authority, the door access control device sets the door locking device to the locking state;

with the door further including:

a translucent reflective layer mounted to the first side thereof, with an intensity of a reflected portion of a light reflected by the translucent reflective layer being greater than an intensity of a transmitted portion of the light transmitted through the second side to the first side of the door, a frame including a first engaging portion and a second engaging portion, with the frame further including a chamber between the first and second engaging portions, with the door access control device mounted in the chamber and coupled to the frame, a double-sided mirror mounted to the first engaging portion of the frame, with the double-sided mirror including an inner face abutting a side of the first engaging portion and an outer face opposite to the inner face, with the translucent reflective layer disposed on the outer face of the double-sided mirror, and a light-transmittable mirror mounted to the second engaging portion of the frame.

10. The door access system as claimed in claim 9, with the light-transmittable mirror further including a light blocking layer disposed on a portion of an outer side of the light-transmittable mirror, with the light blocking layer covering the door access control device, with the light blocking layer having an area slightly larger than an area of the door access control device, and with the light blocking layer configured to block light from passing through the door access control device.

11. A door access system comprising:

a door including a first side and a second side, with the door further including a frame, with the frame including a first engaging portion at the first side and a second engaging portion at the second side, with the frame further including a chamber between the first and second engaging portions, with the door further including a double-sided mirror mounted to the first engaging portion of the frame, with the double-sided mirror including an inner face abutting a side of the first engaging portion and an outer face opposite to the inner face, with the double-sided mirror further including a translucent reflective layer mounted to the outer face thereof, with a light-transmittable mirror mounted to the second engaging portion of the frame, with an intensity of a reflected portion of a light reflected by the translucent reflective layer being greater than an intensity of a transmitted portion of the light transmitted through the second side to the first side of the door, and with the door movable between a closed position and an open position;

a door access control device, including a controller, mounted in the chamber and coupled to the frame;

a camera mounted in the chamber and in electrical connection with the door access control device, with the camera configured to pick up an image of a passerby at an outside facing the first side of the door in the closed position and configured to send the image of the passerby to the door access control device for identifying an identity of the passerby; and a door locking device in electrical connection with the door access control device, with the door access control device configured to set the door locking device to a locking state or an unlocking state, with the door in the closed position and with the door locking device set to the locking state, the door is not movable from the closed position to the open position, with the door in the closed position and with the door locking device set to the unlocking state, the door is movable from the closed position to the open position, wherein when the door access control device uses the image picked up by the camera and identifies the passerby as an authorized person granted with door access authority, the door access control device sets the door locking device to the unlocking state, and wherein when the door access control device uses the image picked up by the camera and identifies the passerby as a non-authorized person not granted with door access authority, the door access control device sets the door locking device to the locking state.

12. The door access system as claimed in claim 11, with the light-transmittable mirror further including a light blocking layer disposed on a portion of an outer side of the light-transmittable mirror, with the light blocking layer covering the door access control device, with the light blocking layer having an area slightly larger than an area of the door access control device, and with the light blocking layer configured to block light from passing through the door access control device.

13. The door access system as claimed in claim 11, with the door access control device further including:

the controller, in electrical connection with the camera, and an awakening detector in electrical connection with the controller, with the awakening detector configured to detect a presence of the passerby at the outside of the door, wherein when no presence of the passerby at the outside of the door is detected, the control module controls the camera to hibernate, and wherein when the presence of the passerby at the outside of the door is detected, the controller controls the camera to pick up the image of the passerby and to send the image of the passerby to the control module.

14. The door access system as claimed in claim 11, with the door access control device further including a screen in electrical connection with the controller, wherein the screen displays a first message when the door access control device sets the door locking device to the unlocking state, wherein the screen displays a second message when the door access control device sets the door locking device to the locking state, and wherein when no presence of the passerby at the outside of the door is detected, the controller controls the screen to hibernate.

15. The door access system as claimed in claim 13, with the door access control device further including a transparent screen in electrical connection with the controller, with the transparent screen abutting the inner surface of the double-sided mirror, wherein the transparent screen displays a first message when the door access control device sets the door locking device to the unlocking state, wherein the transparent screen displays a second message when the door access control device sets the door locking device to the locking state, and wherein when no presence of the passerby at the outside of the door is detected, the controller controls the transparent screen to hibernate.

\* \* \* \* \*